(12) United States Patent
Desoto-Burt et al.

(10) Patent No.: US 9,346,200 B2
(45) Date of Patent: May 24, 2016

(54) CLOSURE FOR A CONTAINER

(75) Inventors: Widalys Luz Desoto-Burt, Cincinnati, OH (US); Todd Mitchell Day, Bethel, OH (US); Ralph Edwin Neufarth, Liberty Township, OH (US); Richard Darren Satterfield, Bethel, OH (US); Chow-chi Huang, West Chester, OH (US); Miguel Alberto Herrera, Loveland, OH (US); Alfredo Pagan, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/350,361

(22) Filed: Jan. 13, 2012

(65) Prior Publication Data

US 2012/0181302 A1     Jul. 19, 2012

Related U.S. Application Data

(60) Provisional application No. 61/433,079, filed on Jan. 14, 2011, provisional application No. 61/433,052, filed on Jan. 14, 2011, provisional application No. 61/433,062, filed on Jan. 14, 2011, provisional (Continued)

(51) Int. Cl.
*B65D 47/20*     (2006.01)
*B29C 45/00*     (2006.01)
(Continued)

(52) U.S. Cl.
CPC ............... *B29C 45/00* (2013.01); *B65D 1/023* (2013.01); *B65D 1/0223* (2013.01);
(Continued)

(58) Field of Classification Search
CPC ............ B65D 47/2006; B65D 2543/00916; B65D 50/041; B29C 45/1676; B29L 2031/565
USPC ................... 222/533–537, 531, 556, 517
See application file for complete search history.

(56) References Cited

U.S. PATENT DOCUMENTS 2,209,050 A * 7/1940 Church ....................... 222/556
3,111,245 A * 11/1963 Libit et al. .................. 222/534
(Continued)

FOREIGN PATENT DOCUMENTS

BR         9505903 A      1/1998
CH          598931 A5     5/1978
(Continued)

OTHER PUBLICATIONS

U.S. Appl. No. 13/350,336 USPTO Office Action dtd May 2, 2013.
(Continued)

*Primary Examiner* — Frederick C Nicolas
*Assistant Examiner* — Robert Nichols, II
(74) *Attorney, Agent, or Firm* — Linda M. Sivik

(57) ABSTRACT

A first component which assembles onto an outlet opening of a container and provides a seal; the first component containing a snap component to engage to a second component to form a closure; a second component combined with first component forms a dispensing orifice wherein the dispensing orifice is positioned directly adjacent to the open portion of container outlet; a motion of second component pivots about an axis to open a dispensing orifice; wherein second component engages with first component when second component is moved relative to first component to enable operation of orifice; first component comprising one or more elements being in a specific juxtaposition enabling a small height and a low profile for one or more elements of first component; the element(s) being in the plane or below the plane of the outlet of the container.

18 Claims, 6 Drawing Sheets

Related U.S. Application Data application No. 61/433,068, filed on Jan. 14, 2011, provisional application No. 61/433,072, filed on Jan. 14, 2011, provisional application No. 61/432,698, filed on Jan. 14, 2011.

(51) Int. Cl.
  *B65D 1/02* (2006.01)
  *B29C 49/04* (2006.01)
  *B29C 49/06* (2006.01)
  *B29L 31/00* (2006.01)
  *B29C 45/16* (2006.01)
  *B29L 31/56* (2006.01)

(52) U.S. Cl.
  CPC ............ *B29C 45/1676* (2013.01); *B29C 49/04* (2013.01); *B29C 49/06* (2013.01); *B29L 2031/565* (2013.01); *B29L 2031/7158* (2013.01); *Y02W 90/11* (2015.05)

(56) References Cited

U.S. PATENT DOCUMENTS

| | | | |
|---|---|---|---|
| 3,374,917 A | | 3/1968 | Troy |
| 3,542,256 A | * | 11/1970 | Waterman ............... 222/484 |
| 4,273,248 A | | 6/1981 | Lehmann |
| D263,805 S | | 4/1982 | Seager |
| 4,506,489 A | | 3/1985 | Schieser et al. |
| 5,051,084 A | | 9/1991 | Guarriello et al. |
| 5,209,891 A | | 5/1993 | Guarriello et al. |
| 5,364,675 A | | 11/1994 | Guarriello et al. |
| 5,503,886 A | | 4/1996 | Guarriello et al. |
| 5,505,612 A | | 4/1996 | Mero et al. |
| 5,850,950 A | | 12/1998 | Hofmann |
| 5,921,416 A | | 7/1999 | Uehara |
| 6,029,866 A | * | 2/2000 | Wood et al. ............. 222/536 |
| 6,041,975 A | | 3/2000 | Flak |
| D435,793 S | | 1/2001 | Kreiseder |
| D438,114 S | | 2/2001 | Stonberg |
| D440,495 S | | 4/2001 | Hathaway |
| 6,257,431 B1 | | 7/2001 | Baudin |
| 6,290,094 B1 | | 9/2001 | Arnold et al. |
| 6,325,252 B1 | | 12/2001 | Brozell et al. |
| 6,416,173 B2 | | 7/2002 | Kishida et al. |
| 6,478,194 B2 | * | 11/2002 | Haglund et al. ......... 222/153.14 |
| 6,622,895 B2 | * | 9/2003 | McClean et al. ........... 222/570 |
| 6,811,047 B1 | | 11/2004 | Hicks et al. |
| D574,241 S | | 8/2008 | Braukmann et al. |
| D613,160 S | | 4/2010 | Ablo |
| 7,740,155 B1 | * | 6/2010 | Gallegos ................. 222/494 |
| D670,164 S | | 11/2012 | Pagan et al. |
| D672,243 S | | 12/2012 | Desoto-Burt et al. |
| 2002/0053524 A1 | | 5/2002 | Alticosalian |
| 2002/0066755 A1 | * | 6/2002 | Garibaldi ............... 222/524 |
| 2005/0144913 A1 | | 7/2005 | Pagh |
| 2007/0251959 A1 | * | 11/2007 | Brotchner ............... 222/534 |
| 2008/0124432 A1 | | 5/2008 | Ma |
| 2008/0202966 A1 | | 8/2008 | Fields et al. |
| 2009/0045157 A1 | | 2/2009 | Panchal et al. |
| 2010/0140280 A1 | | 6/2010 | Burke et al. |
| 2010/0308043 A1 | | 12/2010 | Wimmer |
| 2012/0031548 A1 | | 2/2012 | Broad |
| 2012/0181209 A1 | | 7/2012 | Desoto-Burt |
| 2012/0181272 A1 | | 7/2012 | DeSoto-Burt et al. |
| 2012/0181278 A1 | | 7/2012 | DeSoto-Burt et al. |
| 2012/0181292 A1 | | 7/2012 | Desoto-Burt |
| 2012/0181302 A1 | | 7/2012 | Desoto-Burt |

FOREIGN PATENT DOCUMENTS

| | | | | |
|---|---|---|---|---|
| CN | 300919834 A | | 5/2009 | |
| CN | 300990533 A | | 8/2009 | |
| CN | 301056126 A | | 11/2009 | |
| DE | 2542045 A1 | | 3/1977 | |
| DE | 8808369 U1 | | 8/1988 | |
| DE | 69119790 T2 | | 10/1996 | |
| EM | 1174874.0004 A | | 1/2010 | |
| EP | 0437332 A | | 7/1991 | |
| EP | 0407976 A | | 1/1992 | |
| EP | 0446991 A | | 9/1992 | |
| EP | 0908393 A | | 4/1999 | |
| EP | 911272 A | | 10/2000 | |
| EP | 997289 A | | 4/2001 | |
| EP | 1115647 A1 | | 7/2001 | |
| EP | 1177988 A | | 2/2004 | |
| EP | 1394052 A1 | | 3/2004 | |
| EP | 1566359 A1 | | 8/2005 | |
| EP | 1826133 A1 | | 8/2007 | |
| EP | 1870346 A1 | | 12/2007 | |
| EP | 1930246 A1 | | 6/2008 | |
| EP | 2216253 A1 | | 8/2010 | |
| FR | 2737194 | | 9/1997 | |
| FR | 2752820 A1 | | 3/1998 | |
| FR | 2803273 A1 | * | 7/2001 | ............ B65D 5/748 |
| GB | 2371041 A | | 7/2002 | |
| JP | 60220722 A | | 11/1985 | |
| JP | 63139004 | | 6/1988 | |
| JP | 7285167 A | | 10/1995 | |
| JP | 3298742 B2 | | 12/1995 | |
| JP | 7329132 A | | 12/1995 | |
| JP | 8267520 A | | 10/1996 | |
| JP | 9254203 A | | 9/1997 | |
| JP | 10071634 A | | 3/1998 | |
| JP | 11276948 A | | 10/1999 | |
| JP | 2000024769 A | | 1/2000 | |
| JP | 2001191373 A | | 7/2001 | |
| JP | 2001310335 A | | 11/2001 | |
| JP | 2002225908 A | | 8/2002 | |
| JP | 2003181908 A | | 7/2003 | |
| JP | 2003245957 A | | 9/2003 | |
| JP | 2005-178865 | | 7/2005 | |
| KR | 2008003965 A | | 9/2008 | |
| KR | 2010006308 A | | 1/2010 | |
| WO | 9010532 A1 | | 9/1990 | |
| WO | 03016157 A | | 2/2003 | |
| WO | 201005607 A | | 1/2010 | |

OTHER PUBLICATIONS

U.S. Appl. No. 13/350,320 USPTO Office Action dtd May 15, 2013.
U.S. Appl. No. 13/350,320 USPTO Office Action dtd Jan. 4, 2013.
International Search Report; PCT/US2012/021262; Date of Mailing Jul. 31, 2012; 16 pages.
International Search Report PCT/US2012/021238; Mailing Date Mar. 23, 2012; 13 pages.
International Search Report PCT/US2012/021241; Mailing Date Apr. 26, 2012; 14 pages.
International Search Report PCT/US2012/021265; Mailing Date Mar. 22, 2012; 15 pages.

* cited by examiner

CLOSURE FOR A CONTAINER

CROSS REFERENCE TO RELATED APPLICATION

The application claims priority of U.S. Provisional Application Ser. No. 61/433,079, filed on Jan. 14, 2011; and U.S. Provisional Application Ser. No. 61/433,052, filed on Jan. 14, 2011; and U.S. Provisional Application Ser. No. 61/433,062, filed on Jan. 14, 2011; and U.S. Provisional Application Ser. No. 61/433,068, filed on Jan. 14, 2011; and U.S. Provisional Application Ser. No. 61/433,072, filed on Jan. 14, 2011; and U.S. Provisional Application Ser. No. 61/432,698, filed on Jan. 14, 2011, all of which are herein incorporated by reference.

FIELD OF THE INVENTION

The present invention relates a closure for an outlet opening of a container comprising a first component which assembles onto an outlet opening of a container and provides a seal for an outlet opening; said first component also contains a snap component to engage to a second component to form a closure; a second component combined with the first component forms a dispensing orifice wherein the dispensing orifice is positioned directly adjacent to the open portion of the container outlet; a motion of the second component pivots about an axis to open a dispensing orifice; wherein the second component will engage with the first component when the second component is moved relative to the first component to enable operation of the orifice. In particular, the present invention relates to a first component comprising one or more elements being in a specific juxtaposition enabling a small height and a low profile for one or more elements of the first component wherein a seal and a second component back portion are in the plane or below the plane of the outlet of the container.

BACKGROUND OF THE INVENTION

A variety of packages, including dispensing packages or containers, have been developed for household products, personal care products, and other products. Currently, there are several closure designs on store shelves. They all vary from Disc/pivot top, push to open, flip top, push and pull, twist to open, as well as a variety of others. A current disadvantage of all these closures is that they don't take into consideration the ease of use, audible/tactile signals, intuitiveness, and ergonomic features that delights the consumer. In the present invention, all designs being developed take into consideration consumer insight. All closures represent one handed operation that demonstrates obviousness in open and close position with integrated locking features. Also, the present invention will enable upright and inverted use of the package. Each closure is holistically designed to deliver intuitive operation; obviousness of being open or closed; ergonomic to operate; and providing all of the sensory (audible, tactile and visual) cues for operation. Further, the present invention expands on consumer insights that drive to efficiency per usage experience.

Currently, most closures complete the geometry of the container, thereby requiring the size of the closure to be proportional to the geometry of the container. In the present invention, the size of the closure is minimized thereby providing several benefits. One of the benefits is reducing the weight of the closure to the minimum amount of resin needed to enable the required closure functionality. This is a benefit for the environment as industry currently does not have a well established polypropylene recycling stream. By having a closure that has a reduced weight from the overall package, allows a container to have improved recyclability. It also reduces the overall costs of the closure including costs associated with resin, processing, tooling, injection mold (IM) press selection, and others. Another benefit of minimizing closure size is that the closure becomes a less focal point of the design making it more inductive to use the same closure for different container designs within one brand and even enable the use of the same closure across different brands/shaped families. This drives optimization and efficiency and in return reduces further costs. This further enables the silhouette of the shape to be scaled proportionally without the use of additional features such as container shoulders and angles to accommodate the closure.

Another benefit for minimizing the closure size is that it can be integrated in the container shape. When the container is in its inverted orientation, an integrated design allows the use of the container top surface to add stability vs. requiring a larger closure. This drives scale in the container design and development, and therefore is an advantage. It also aids in creating differentiation between the forms (such as shampoo and conditioner), helping consumers identify the product that they are looking for.

SUMMARY OF THE INVENTION

A closure for an outlet opening of a container comprising a first component which assembles onto an outlet opening of a container and provides a seal for an outlet opening; said first component also contains a snap component to engage to a second component to form a closure; a second component combined with the first component forms a dispensing orifice wherein the dispensing orifice is positioned directly adjacent to the open portion of the container outlet; a motion of the second component pivots about an axis to open a dispensing orifice; wherein the second component will engage with the first component when the second component is moved relative to the first component to enable operation of the orifice and wherein the first component comprises one or more elements being in a specific juxtaposition enabling a small height and a low profile for one or more elements of the first component wherein a seal and a second component back portion are in the plane or below the plane of the outlet of the container.

DETAILED DESCRIPTION OF THE INVENTION

Figure 1A:
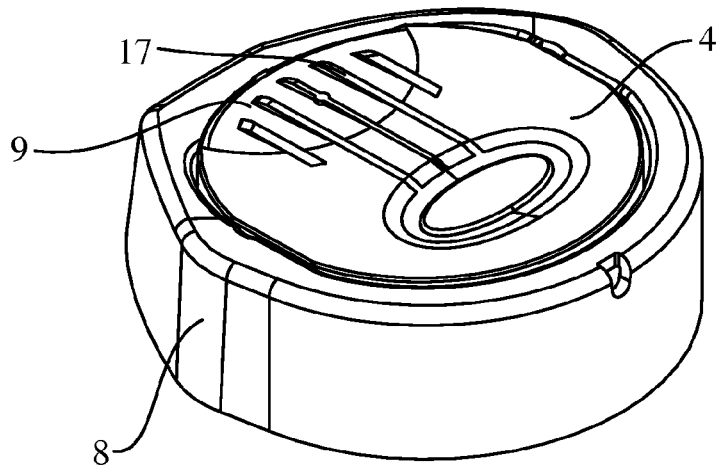
FIG. 1A is an isometric view of a closure.
Figure 1B:
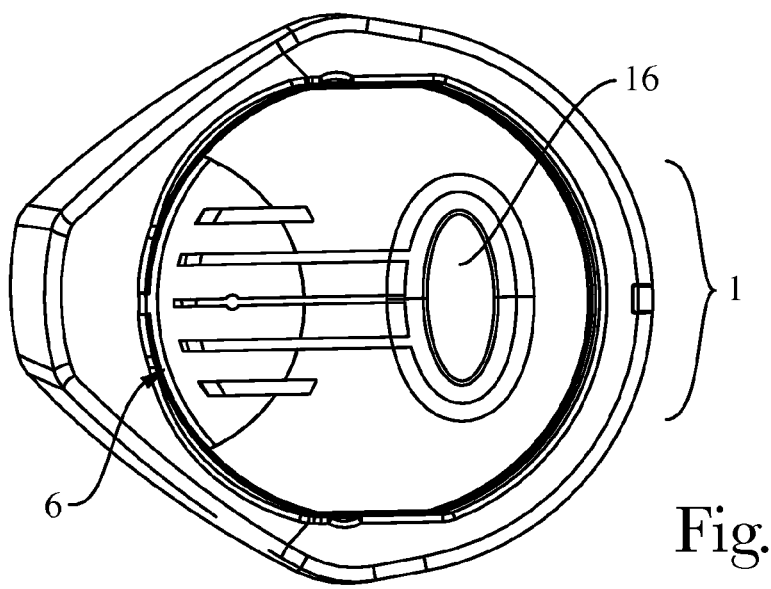
FIG. 1B is a top view of a closure.
Figure 1C:
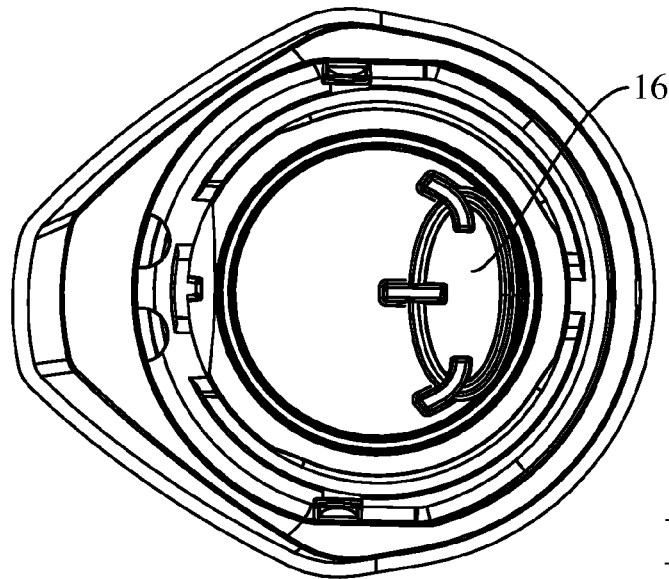
FIG. 1C is an underside view of a closure.
Figure 2:
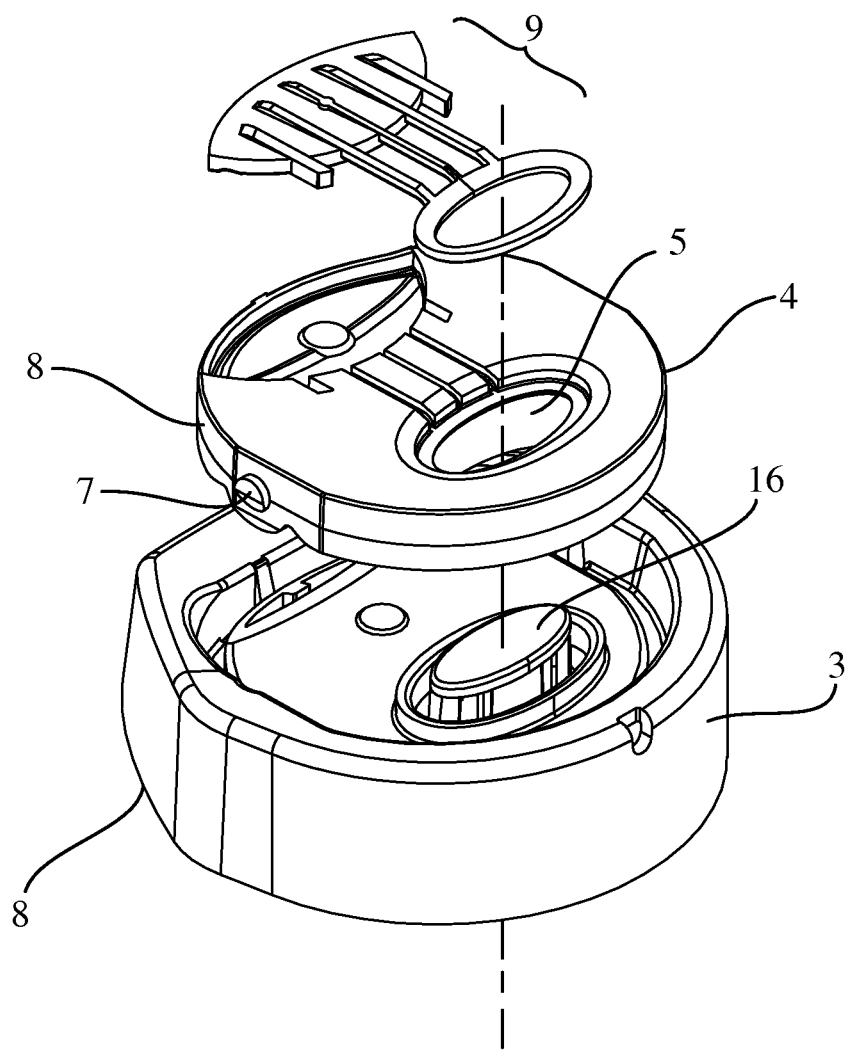
FIG. 2 is an exploded view of a closure.
Figure 3A:
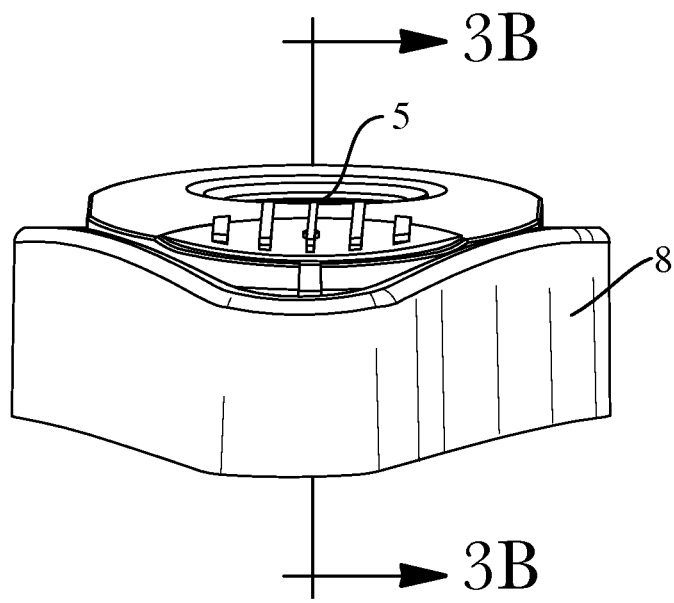
FIG. 3A is an isometric view of a closure depicting the line for a cross section view depicted in FIG. 3B.
Figure 3B:
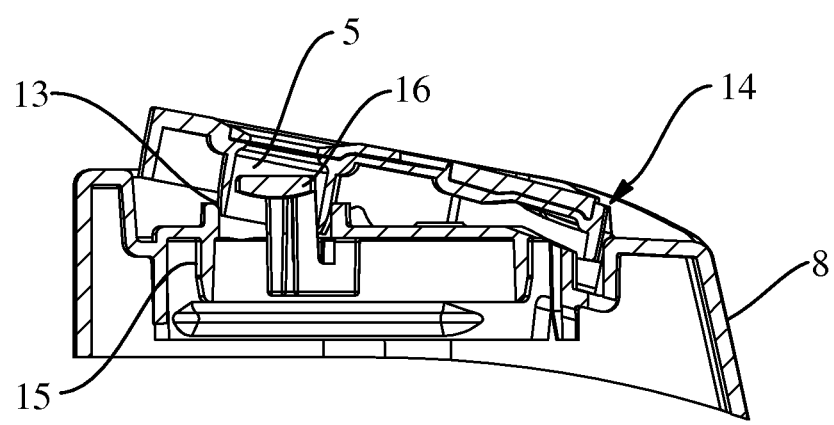
FIG. 3B is a cross section view of a closure.
Figure 4A:
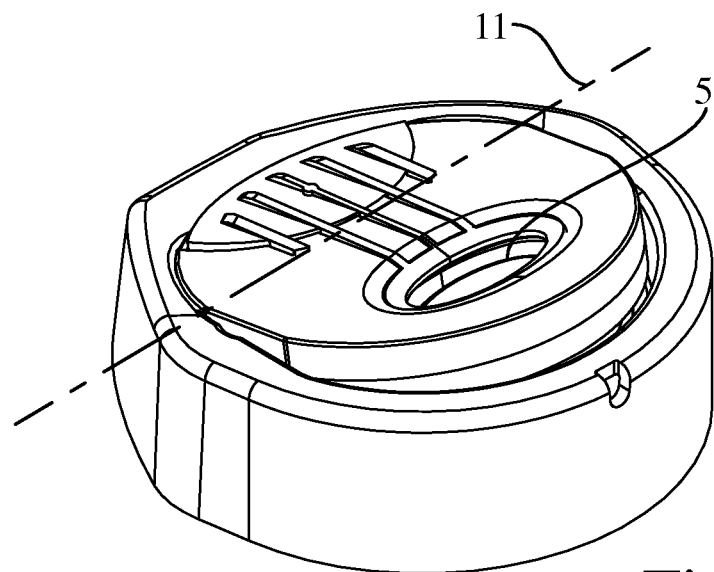
FIG. 4A is an isometric view of a closure in an open position.
Figure 4B:
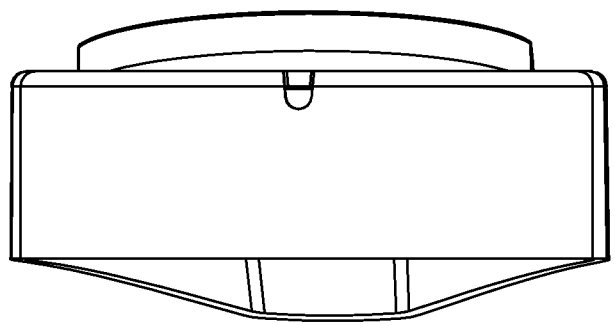
FIG. 4B is a front view of a closure in an open position.
Figure 4C:
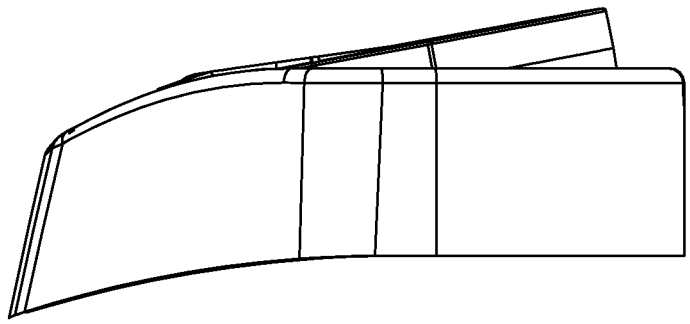
FIG. 4C is a side view of a closure in an open position.

The present invention is directed to a closure (1) for an outlet opening of a container (2) comprising a first component (3) which assembles onto an outlet opening of a container and provides a seal for an outlet opening; said first component also contains snap component(s) (7) to engage to a second component (4) to form a closure (1); a second component (4) combined with the first component (3) forms a dispensing orifice (5) wherein the dispensing orifice (5) is positioned directly adjacent to the open portion of the container (2) outlet; a motion of the second component (4) pivots about an axis (11) to open a dispensing orifice (5) to reveal access of the interior of a container (2) outlet to the external environment. In this embodiment, non-limiting examples of a motion of the second component (4) may rotate or move in a see-saw motion about a fixed axis or fixed point of rotation.

In an embodiment of the present invention, a closure (1) is integrated into a body of a container (12). In the present invention, by configuring a closure as small as possible by volumetric size and weight, this may enable the offset of the closure to one side and allows the container shoulder (10) to be flush to the top of closure (1) or in a further embodiment, enable the closure (1) to be centered between shoulders. This will also allow the full integration of the closure (1) within any portion of the container body (12).

In an embodiment of the present invention, a closure (1) comprises the dispensing orifice (5) on a top surface of the second component (4).

There are several disc top closures that currently exist. Such disc top closures all have the dispensing orifice on the side of the closure. Users do not prefer this configuration because a dispensed product will dry out when this type of closure is either in the open or closed position. Alternatively, in the present invention, a closure (1) as described in this invention contains a dispensing orifice (5) which is positioned directly on top of the closure (1) instead of on the side of a closure. The present invention configuration allows a user to wipe off and clean any residues left on top of the closure (1).

In a further embodiment of the present invention, the closure (1) is integrated with a container body (12). By having a closure (1) as small as functionally possible; it may provide a centered or an offset of the closure (1) to one side and have the container shoulder (10) flush to the closure top surface. It also provides full integration of the closure (1) within the shoulder(s) (10) of a container (1).

For example, in an inverted orientation, a closure which is integrated allows for the use of a container body to add stability, rather than requiring a closure (1) scaled to the footprint of the container.

Figure 5:
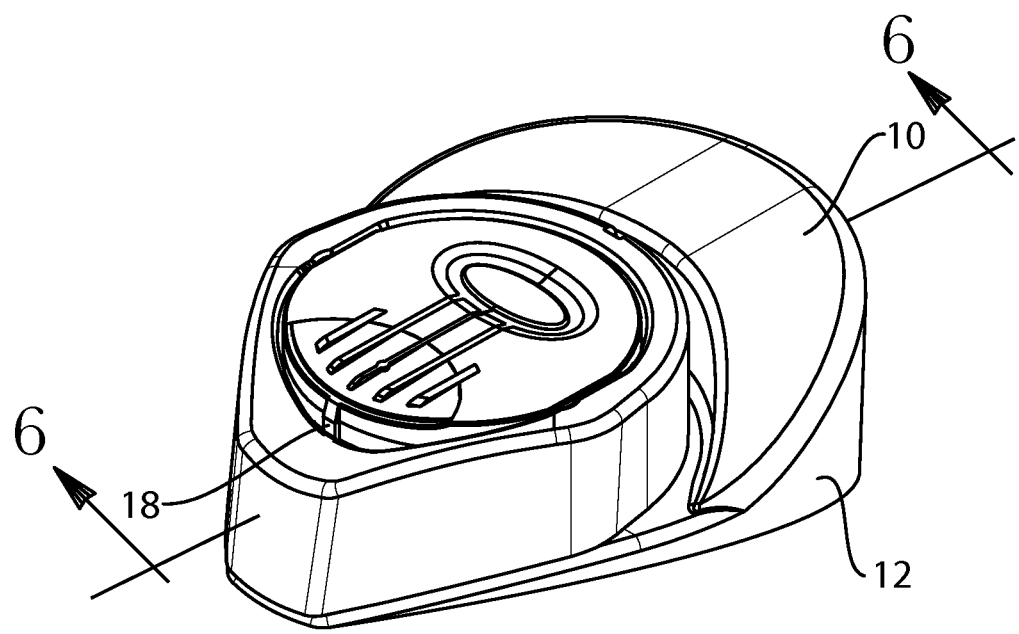
FIG. 5 is an isometric view of a closure integrated with a shoulder of a container depicting the line for a cross section view depicted in FIG. 6.

In an embodiment of the present invention, the closure (1) is integrated with a body of a container, as shown in FIG. 5, wherein geometry of the closure acts in completing the silhouette of the container body (12). In an inverted orientation a recessed closure allows the use of a container shoulder to add stability vs. requiring a full size closure on top of a container.

Figure 6:
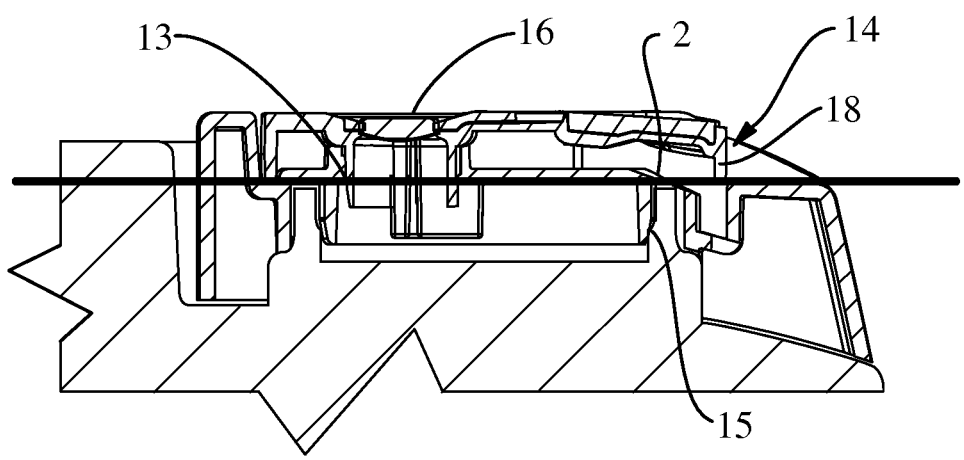
FIG. 6 is a cross section view of a closure and a container of FIG. 5.

In an embodiment in the present invention, a dispensing orifice (5) positioned directly adjacent to the open portion of the container outlet (2) wherein the second component (4) will engage with the first component (3) when the second component (4) is moved relative to the first component (3) to enable operation of the orifice and wherein the first component (3) comprises one or more elements/one or more mechanical features being in a specific juxtaposition enabling a small height/low profile/a narrow profile for one or more of the mechanical features/elements of the first component wherein the seal (13) is in the plane or below the plane of the outlet of the container (2) as shown in FIG. 6. In a further embodiment, the second component back portion (14) rides under the plane of the outlet of the container (2) when the closure (1) is moved from the closed to the open position. This enables these features of the seal (13) and the second component back portion (14) to be placed at locations that are typically considered dead space. This allows for a design that has significantly less height than typical closures and as a result significant weight reduction of the overall closure is achieved. This will not only enable significant manufacturing cost reduction but, will also enable sustainability improvement by developing a closure than can be manufactured in half or less time (due to less energy consumption) and less gram weight utilization (due to reduction in waste) than average closures.

In an embodiment of the present invention, wherein the first component (3) comprises one or more elements or one or more mechanical features being in a specific juxtaposition enabling a small height/low profile/a narrow profile regardless of the diameter of the outlet of the container (2).

In an embodiment of the present invention, the height or distance of the specific juxtaposition may stay constant regardless of the size of the diameter of container opening. For example, the low profile needed for a small container opening may stay constant for a larger container opening.

In an embodiment of the present invention, the first component (3) may comprise one or more sealing regions, such as a plug seal (15) and telescoping seal (13) located on the top of the neck or extending beyond the top plane of the neck or top plane/surface of the neck and inside the neck of the container or it is located within the height of the neck or below the neck of the container enabling a small height or low profile or a narrow plane or same plane for mechanical features/elements of the first component.

In a further embodiment of the present invention, a closure geometry provides a surface for optimal leverage to operate a closure. In an embodiment of the present invention, a closure (1) may be operated by a single hand of a user or two hands of a user. The closure (1) of the present invention can be easily be operated by a user using either one or two hands. The closure (1) has an actuation point (6) that is strategically positioned to enable ease of use with either wet or dry hands. The actuation point (6) may be positioned as close as possible to the edge of the container for easy access. The actuation point (6) may also be co-molded with a material to improve operation with wet hands.

In an embodiment of the present invention, a closure (1) and a container (2) connected to a closure (1) are held by a single hand of a user and closure is operated by a single digit of the single hand. In an embodiment, a closure of the present invention may be easily operated by a user with either one or two hands. A closure (1) may have an actuation point (6) that is strategically positioned to enable ease of use with either wet or dry hands. The actuation point may be positioned as close as possible to the edge of the container for easy access. The actuation point (6) may also be co-molded with another and/or different material to improve operation with wet hands.

In a further embodiment of the present invention, a closure (1) contains a soft material which provides a seal and prevents leakage. In an embodiment of the present invention, a closure (1) may comprise a seal against a spud (16) which is comprised of a hard and soft material. In an embodiment of the present invention, the seal may be any interface between the first component (3) and second component (4) and the spud (16) may be the portion of the component that plugs the dispensing orifice (5). In this embodiment, the soft-like material in the dispensing orifice (5) will enable for a robust seal between the dispensing orifice (5) and spud design (16). In this embodiment, the softer material may conform to the shape of the spud design, allowing for a better seal vs. hard material to hard material components or vice versa hard material in seal and soft material in spud. In a further embodiment of the present invention, a closure may comprise materials which may improve functional performance (sealing, ergonomics, stability on storage surfaces, visual aid for user, container durability, customized the tactile and audible signals to the user and mixtures thereof).

In an embodiment of the present invention, a closure (1) the thermoplastic elastomer may be selected from the group consisting of styrenic block copolymers, polyolefin blends, elastomeric alloys (TPE-v or TPV), thermoplastic polyurethanes, thermoplastic copolyester and thermoplastic polyamides and mixtures thereof.

In an embodiment of the present invention, a closure (1) may comprise a thermoplastic elastomer material which provides tactile features (17). A closure (1) may be molded with at least one material (such as a hard material (8)) or a soft material (9). The TPE type material may delight the user with a soft touch feel while opening and closing the closure which is soft, conformable, or malleable or is textured.

In an embodiment of the present invention, a closure may comprise at least two materials. A closure may be molded with a hard material (8) (such as a polypropylene (PP) like resin) and a soft material (9). In a further embodiment of the presents invention such hard materials may be hard resins such as Polyolefin resins, such as Polyethylene PE and polypropylene PP; Acrylates, such as Poly methyl acrylate, PMA; Carbonates such as Polycarbonate PC; Carbonates, such as Polycarbonate PC; Methacrylates, such as poly methyl methacrylate PMMA; Amides such as Nylon 6; Acetal; Copolymers, such as Acrylonitrile butadiene styrene—ABS; Chlorinated Polymers, such as Poly vinyl chloride PVC; Styrenics, such as Polystyrene PS; Esters, such as polyethylene terephthalate PET; Modified Esters such as PETG; Polyformaldehyde such as Delrin; Methacrylates, such as poly methyl methacrylate PMMA; Amides, such as Nylon 6; Acetal; Copolymers such as Acrylonitrile butadiene styrene—ABS; Chlorinated Polymers, such as Poly vinyl chloride PVC; Styrenics, such as Polystyrene PS; Esters, such as polyethylene terephthalate PET; Modified Esters, such as PETG; and Polyformaldehyde, such as Delrin. Such soft material (19) may include soft injection moldable resins; Thermoplastic elestomers; TPE including styrenic (SEBS and SBS) based and olefin (TPO PP Elastomer) based; Thermoplastic eurothanes TPU; Melt Processable Rubber MPR; Thermoplastic Vulcanizate TPV; and Poly vinyl chloride PVC and mixtures thereof. In an embodiment of the present invention, the soft like material may delight the consumer with a soft touch feel while opening and closing the closure.

In a further embodiment of the present invention, soft resins that are not injection molded may be used, such as silicone; and urethane rubbers.

In an embodiment of the present invention, a closure wherein the closure comprises an ergonomic design to help reduce the force used to open and close the closure.

In an embodiment of the present invention, a closure comprises a flow path which in turn improves the flow rate of a fluid being dispensed, when compared to a closure having an orifice that is not adjacent to the container outlet and thus comprises an increased angle of delivery and results in the need for a higher force to dispense at the same flow rate of a closure of the present invention.

In an embodiment of the present invention, a closure may comprise an audible sound mechanism (18). The closure has a mechanical feature such as a rib that will generate a sound as the user manipulates the closure from an open to a closed position. This will let the user know when the closure is fully opened and secured when is fully closed.

In a further embodiment of the present invention, a closure comprises tactile features (17) and/or visual features that provide the user with direction on how to operate the closure. The closure may incorporate tactile and visual cues to let the user know where to press or push to open.

In an embodiment of the present invention, a closure may be comprised of a sustainable material which is selected from the group consisting of biopolymers made from non-petroleum sources, biodegradable polymers, recycled resins and mixtures thereof. In yet a further embodiment of the present invention, a closure may be comprised of a sustainable material which is a from a non-petroleum source wherein the non-petroleum source is selected from the group consisting of bio-derived polyethylene, bio derived polypropylene, bio derived polyesters and mixtures thereof.

In a further embodiment of the present invention, a closure is comprised of a sustainable material. The closure may be manufactured completely with sustainable materials or either the first component (3) or second component (4) only. This may allow for a more recyclable closure. Some of the materials that could be used are: PCR, HDPE, LDPE, Bamboo, renewable resins include PLA (polylactic acid), PHA (polyhydroxyalkanoate), and bio-polyolefins (bio-PE, bio-PP, bio-PET), where starting materials are plants or biomass instead of oil; recycled and recyclable resins include PP PCR (post consumer regrind) and PIR (post industrial regrind), which are resins diverted from trash to be reprocessed and/or reused instead; Natural fillers include minerals (e.g. CaCO3), wood, pulp, paper, bamboo, grass, kenaf, bulrush, and other natural plants that have been crushed, cut, broken, or pulverized for inclusion in plastics; renewable resins include PLA (polylactic acid), PHA (polyhydroxyalkanoate), and bio-polyolefins (bio-PE, bio-PP, bio-PET), where starting materials are plants or biomass instead of oil; recycled and recyclable resins include PP PCR (post consumer regrind) and PIR (post industrial regrind), which are resins diverted from trash to be reprocessed and/or reused instead; Natural fillers including minerals (e.g. CaCO3), wood, pulp, paper, bamboo, grass, kenaf, bulrush, and other natural plants that have been crushed, cut, broken, or pulverized for inclusion in plastics; some recycled miscellaneous materials can be used as fillers, including waste currency (e.g. U.S. dollar bills)

The sustainable materials may include biopolymers made from non-petroleum sources, biodegradable polymers, recycled resins and mixtures thereof. Some non-limiting examples of the potential biopolymers that could be used for this application are bamboo, paper, and grass. A non-petroleum source may be selected from the group consisting of bio-derived polyethylene, bio derived polypropylene, bio derived polyesters and mixtures thereof. Some or all of the sustainable material may contain colorants, antistatics, UV inhibitors, or other small quantity additives to change the appearance or performance.

In a further embodiment of the present invention, a container made by the present invention wherein the container is comprised of a biodegradable polymer material selected from the group consisting of polyglycolic acid (PGA), polybutylene succinate (PBS), an aliphatic-aromatic copolyester based on terephthalic acid, an aromatic copolyester with a high terephthalic acid content, thermoplastic starch (TPS), cellulose, or a mixture thereof.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A closure for an outlet opening of a container comprising:
   a) a first component which assembles onto an outlet opening of a container and provides a seal for an outlet opening; said first component also contains a snap component to engage to a second component to form the closure;
   b) the second component combined with the first component forms a dispensing orifice wherein the dispensing orifice is positioned directly adjacent to the open portion of the container outlet;
   c) a push motion of the second component pivots about an axis to open the dispensing orifice wherein the second component rotates and moves in a see-saw motion about the axis;
   wherein the second component will engage with the first component when the second component is moved relative to the first component to enable operation of the orifice, wherein the first component comprises one or more elements being in a specific juxtaposition enabling a small height and a low profile for one or more elements of the first component, the closure includes a seal against a spud that plugs the dispensing orifice, wherein a telescoping seal and a back portion of the second component are in a plane or below the plane of the outlet of the container, and wherein the closure comprises a flow path which decreases a force to dispense a fluid at an increased flow rate.

2. A closure according to claim 1 wherein the closure is integrated into a body of a container.

3. A closure according to claim 2 wherein the closure is integrated with a body of the container wherein geometry of the closure functions in completing the silhouette of the body of the container.

4. A closure according to claim 1 wherein the dispensing orifice is on a top surface of the second component.

5. A closure according to claim 1 wherein the closure is integrated with a container body.

6. A closure according to claim 1 wherein the closure comprises a soft material and a hard material.

7. A closure according to claim 6 wherein the closure seal comprises a soft material that seals against the spud comprising a hard material.

8. A closure according to claim 6 wherein the soft material is selected from the group consisting of Thermoplastic elastomers; TPE including styrenic (SEBS and SBS) based and olefin (TPO PP Elastomer) based; Thermoplastic eurothanes TPU; Melt Processable Rubber MPR; Thermoplastic Vulcanizate TPV; and Poly vinyl chloride PVC and mixtures thereof.

9. A closure according to claim 6 wherein the hard material is selected from the group consisting of polyolefin resins, polyethylene PE, polypropylene PP; Acrylates, poly methyl acrylate, PMA; carbonates, polycarbonate PC; methacrylates, poly methyl methacrylate PMMA; amides, Nylon 6, acetal, copolymers, acrylonitrile butadiene styrene, ABS; chlorinated polymers, poly vinyl chloride PVC; styrenics, polystyrene PS; Esters, polyethylene terephthalate PET; modified esters, PETG, polyformaldehyde Delrin; amides, Nylon 6, acetal, copolymers Acrylonitrile butadiene styrene—ABS, chlorinated polymers, poly vinyl chloride PVC; styrenics, such as polystyrene PS, esters, polyethylene terephthalate PET, modified esters, such as PETG, and polyformaldehyde, delrin and mixtures thereof.

10. A closure according to claim 1 wherein the closure is operated by a single hand of a user or two hands of a user.

11. A closure according to claim 1 wherein the closure and the container connected to the closure are held by a single hand of a user and the closure is operated by a single digit of the single hand.

12. A closure according to claim 1 wherein a thermoplastic elastomer provides soft tactile features.

13. A closure according to claim 1 wherein the closure comprises an ergonomic design to help reduce the force used to open and close the closure.

14. A closure according to claim 1 wherein the closure comprises an audible sound mechanism.

15. A closure according to claim 1, wherein the closure comprises tactile and/or visual features that provide the user with direction on how to operate the closure.

16. A closure according to claim 1 wherein the closure is comprised of a sustainable material.

17. A closure according to claim 16 wherein the sustainable material is selected from the group consisting of biopolymers made from non-petroleum sources, biodegradable polymers, recycled resins and mixtures thereof.

18. A closure according to claim 17 wherein the non-petroleum source is selected from the group consisting of bio-derived polyethylene, bio derived polypropylene, bio derived polyesters and mixtures thereof.

* * * * *